March 17, 1925.
W. M. LEEDOM
FLUID VAPORIZER AND FEED
Filed May 2, 1921
1,530,464
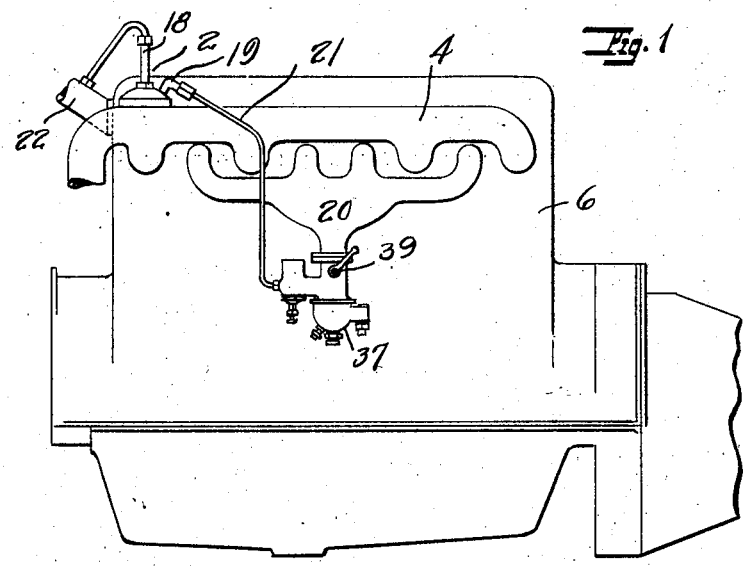
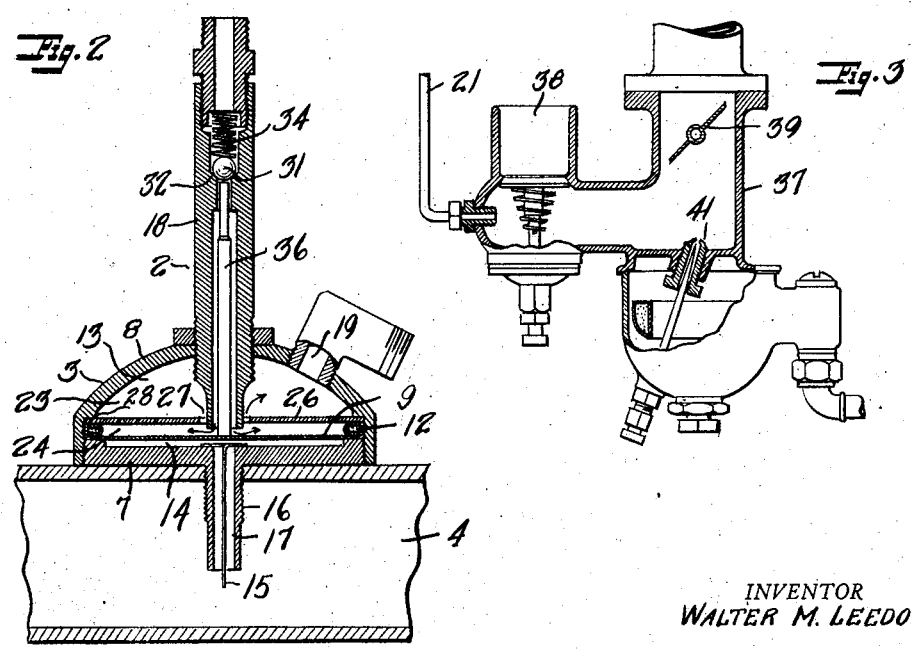
INVENTOR
WALTER M. LEEDOM
BY
Joseph B. Gardner
his ATTORNEY Patented Mar. 17, 1925.

1,530,464

UNITED STATES PATENT OFFICE.

WALTER M. LEEDOM, OF OAKLAND, CALIFORNIA.

FLUID VAPORIZER AND FEED.

Application filed May 2, 1921. Serial No. 466,319.

*To all whom it may concern:*

Be it known that I, WALTER M. LEEDOM, a citizen of the United States, and a resident of Oakland, county of Alameda, and State of California, have invented a new and useful Fluid Vaporizer and Feed, of which the following is a specification.

My invention relates to means for vaporizing a fluid such as water and feeding the vaporized product to the cylinder of an internal combustion engine so as to render the fuel charge more efficient.

An object of the invention is to provide a device of the character described in which the amount of water or fluid introduced into the engine with each charge of fuel will be automatically regulated to vary in direct proportion to the speed of operation of the engine.

Another object of the invention is to provide a device of the present type which may be adjusted to enable any desired amount of the fluid to be admitted to the engine with each charge.

A further object of the invention is to provide a device in which the water may be quickly vaporized.

A still further object of the invention is to mix the vaporized fluid and fuel charge in a manner which will render a most combustible mixture.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a side elevation of an internal combustion engine equipped with the device of my invention.

Figure 2 is an enlarged sectional view of the vaporizer.

Figure 3 is a sectional view of a carbureter showing the manner in which the water or steam is introduced therein.

Briefly expressed the apparatus in the present embodiment of the invention comprises a water vaporizer having a vaporizing chamber adapted to be heated by the exhaust gases of the engine, a water inlet for the vaporizing chamber, an outlet from the chamber adapted to connect with the fuel inlet pipe of the engine at the intake side of the throttle in advance of the fuel nozzle, a compartment in the vaporizer communicating with the engine exhaust gases and provided with a diaphragm which is adapted to be flexed in accordance with the pressure of said gases, and a valve in the water inlet of the vaporizer adapted to be displaced by the flexure of the diaphragm.

A detailed description of the apparatus follows:

The apparatus in the present embodiment of the invention is designed to supply a suitable amount of water, preferably in the form of steam, to the cylinder of an internal combustion engine, and comprises a member 2 which is adapted to function principally as a vaporizer and automatic flow regulator for the water. The member 2 comprises a receptacle 3 somewhat semispherical in form which is arranged to be positioned directly upon the exhaust pipe 4 of the internal combustion engine 6. The receptacle includes a base 7 and a dome 8 which are screwed together and between which are interposed a diaphragm 9 and gasket 12 whereby the receptacle is divided into two compartments 13 and 14 which are sealed from each other. The base 7 is formed with a threaded extension 16 which is screwed tightly into the exhaust pipe 4 in order that the member 2 may be properly supported thereon. The extension is made hollow so as to form a passage 17 which connects the compartment 14 directly with the interior of the exhaust pipe, a wire 15 being preferably loosely held in the passage to keep the latter unobstructed. In this manner the compartment 14 may be filled by the exhaust gases and the pressure exerted against the diaphragm 9 will be exactly the same that obtains within the pipe 4. The utilization of the foregoing will be presently explained.

The other compartment 13 formed in the receptacle is provided with a water inlet conduit 18 and an outlet 19, to the latter of which is connected the pipe 21 leading to the intake pipe 20 of the engine. The inlet 18 is connected to a suitable source of water supply which as here shown is connected to the pipe 22 through which the water for cooling the cylinder walls circulates. The compartment 13 is in turn divided up into two chambers 23 and 24 by a plate 26 which is provided with a central opening or perforation 27 and is preferably held in position between the gasket 12 and the internal shoulder 28 of the dome. The inlet conduit 18, as clearly shown in Figure 2, extends through the perforation 27 directly into the chamber 24, so that the water entering the receptacle is introduced almost in direct contact with hot gases of the exhaust pipe. The various elements composing the walls of the chamber 24 are preferably formed of a material such as copper whose coefficent of heat conductivity is comparatively high. In this manner the water upon entering the chamber and striking the hot walls thereof, are immediately broken up into small particles which scatter in different directions, impinging and rebounding from the walls until they escape in a thoroughly vaporized condition or in other words as steam, through the annular space between the edges of the opening and the sides of the conduit. The steam then escapes through the outlet 19.

Heretofore in the various devices used for automatically supplying water to the engine as a part of the fuel charge thereof, the connections were such that the water was introduced into the fuel intake pipe at a point between the throttle and the engine inlet. With this arrangement the amount of water drawn into the engine with each charge varied directly with the suction in the intake pipe. However since the suction in the intake pipe is greater as the throttle is correspondingly closed, a larger amount of water was drawn into the engine with the fuel charge when the engine was operating slowly and not generating much power, than when the engine was operating at high speed and generating considerable power. In other words the engine was almost invariably supplied with a superabundance of water when such was not required, and a small amount when it could effectively handle a large amount. In accordance with my invention the foregoing is eliminated, for the amount of water supplied to the engine at each charge is directly proportional to its speed and power. I attain this result by utilizing the pressure of the escaping gases in the exhaust pipe, which pressure is practically proportional to the speed and power of the engine.

As shown in Figure 2, the conduit 18 is provided with valve mechanism which as here shown comprises a ball 31 which is normally held against its seat 32 by the spring 34. Arranged immediately below the ball 31 is a stem 36 the lower end of which is adapted to rest upon the diaphragm 9 which forms the upper wall of the exhaust gas compartment 14 of the receptacle. When the engine is operating the pressure of the gases in the compartment 14 causes the diaphragm to flex proportionally and thereby displace the ball accordingly. Thus the greater the pressure of the gases in the exhaust pipe, the greater will be the displacement of the valve, and vice versa the decrease in the pressure will enable the valve to close accordingly.

It will be noted that the conduit 18 has a screw threaded connection with the dome of the receptacle, thereby enabling the conduit to be moved up or down so as to vary the position of the ball with respect to the stem. In this manner practically any desired proportion of the water may be fed to the engine with each fuel charge.

In the present embodiment of the invention the pipe 21 which leads from the steam discharge outlet 19 of the receptacle, is connected to the carbureter 37 adjacent the carbureter air inlet 38 and at a point more remote from the throttle valve 39 than the fuel nozzle 41. In this manner the steam enters the carbureter and warms and thoroughly commixes with the incoming air prior to the mingling of the fuel vapor with the air, thereby enabling the latter as well as the steam to associate themselves more intimately with the hydrocarbon or other fuel particles discharging from the nozzle 41.

I claim:

1. A device for feeding water to an internal combustion engine provided with an exhaust passage and a valve controlled inlet passage having fuel introducing means at the intake side of the valve, comprising means for introducing water directly into said inlet passage at said side of the inlet valve at a point more remote therefrom than that at which the fuel is introduced, means adapted to be heated by the exhaust gases of the engine for enabling the water to enter said inlet passage in the form of vapor, and means controlled by the pressure of the gases in said exhaust passage for controlling the flow of the water to said inlet passage.

2. In a device for vaporizing and feeding water to an internal combustion engine, a receptacle adapted to be heated by being in thermal contact with the exhaust gases of said engine, a water inlet passage and a water outlet passage for said receptacle, and a valve in one of said passages adapted to control the flow of the water therethrough and arranged to be operated by the pressure of said exhaust gases.

3. In a device for vaporizing and feeding a fluid to an internal combustion engine, a receptacle having a fluid inlet and a fluid outlet, a diaphragm forming one of the walls of said receptacle and adapted to be flexed by the variation in pressure of the exhaust gases of the engine, and a valve in said fluid inlet passage adapted to be displaced by said diaphragm.

4. In a device for vaporizing a fluid prior to admission to an internal combustion engine, a receptacle, a diaphragm dividing said receptacle in two compartments, one of said compartments having a passage adapted to communicate with the gases exhausting from said engine, the other of said compartments being provided with a fluid inlet passage and an outlet passage arranged to be connected with the fuel intake passage of the engine, a valve in said fluid inlet passage arranged to cooperate with said diaphragm whereby the valve may be displaced upon the flexure of said diaphragm.

5. In a device for vaporizing a fluid prior to its admission to an internal combustion engine, a receptacle, a diaphragm dividing said receptacle in two sealed compartments, one of said compartments being provided with a passage adapted to communicate with the gases exhausting from the engine, a perforated plate arranged in the other compartment and dividing the latter into two chambers, a fluid inlet conduit extending from the exterior of said receptacle and through one of said chambers into the other by way of the perforation in said plate, the sides of the conduit being spaced from the sides of said perforation whereby the fluid in said last mentioned chamber may discharge into the first, a fluid discharge passage communicating with said first chamber and adapted to be connected to the fuel intake passage of the engine, a normally closed valve arranged in said fluid inlet conduit, and a stem cooperating with said valve and diaphragm whereby the flexure of the diaphragm may unseat the valve.

In testimony whereof, I have hereunto set my hand at Oakland, this 25th day of April, 1921.

WALTER M. LEEDOM.